May 21, 1929.  J. A. KRATZ  1,714,379
BAKING PAN
Filed June 9, 1927   5 Sheets-Sheet 1

John A. Kratz
INVENTOR
BY Victor J. Evans
ATTORNEY

May 21, 1929.  J. A. KRATZ  1,714,379
BAKING PAN
Filed June 9, 1927    5 Sheets-Sheet 2
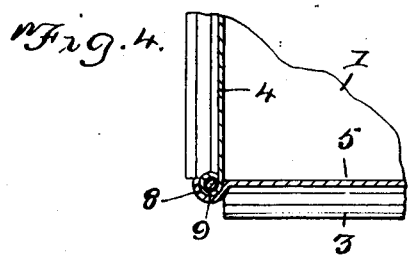
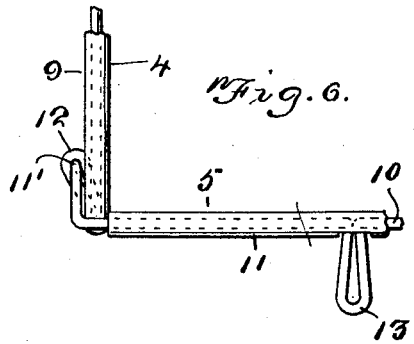
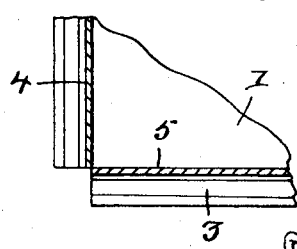
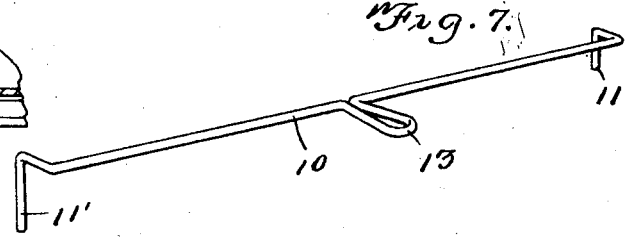
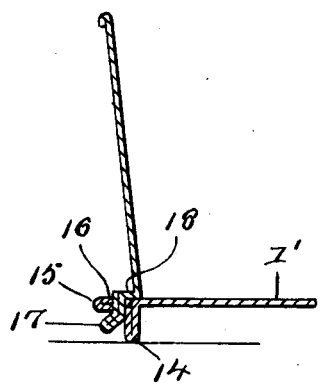
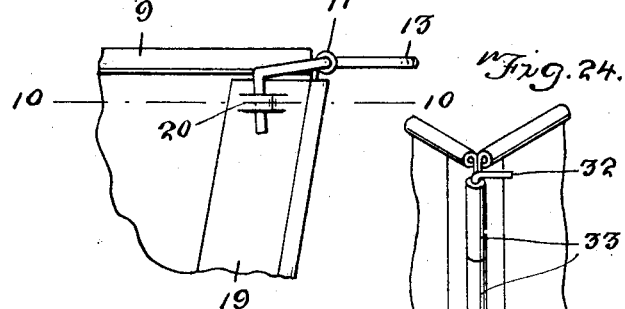
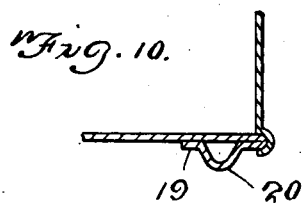
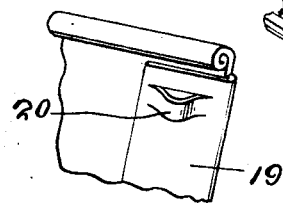
John A. Kratz
INVENTOR
BY Victor J. Evans
ATTORNEY May 21, 1929. J. A. KRATZ 1,714,379
BAKING PAN
Filed June 9, 1927 5 Sheets-Sheet 3
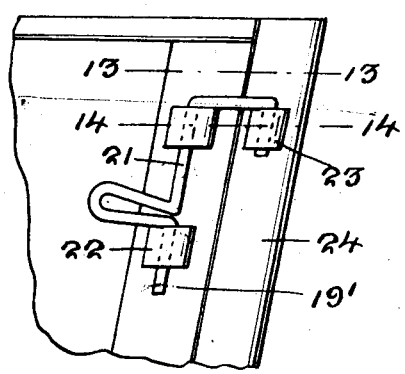
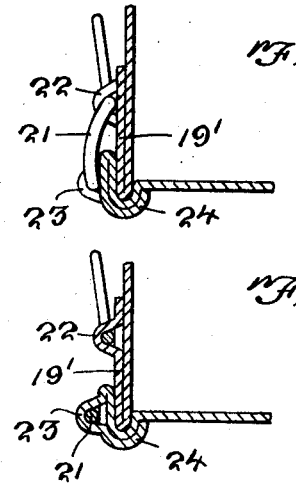
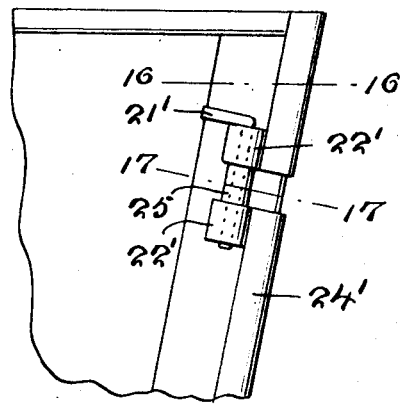
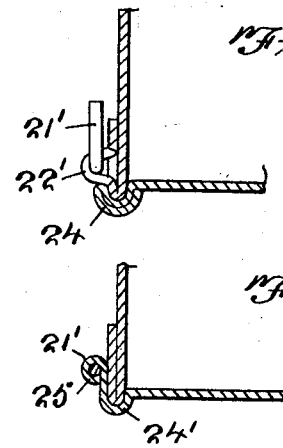
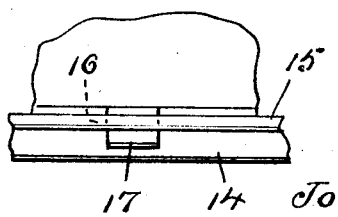
John A. Kratz
INVENTOR
ATTORNEY

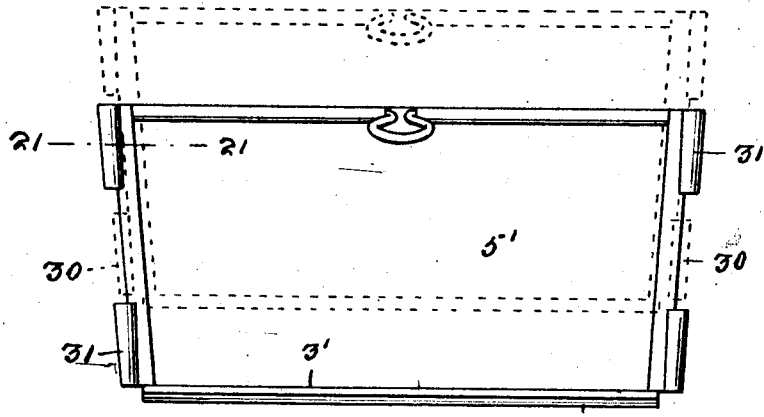
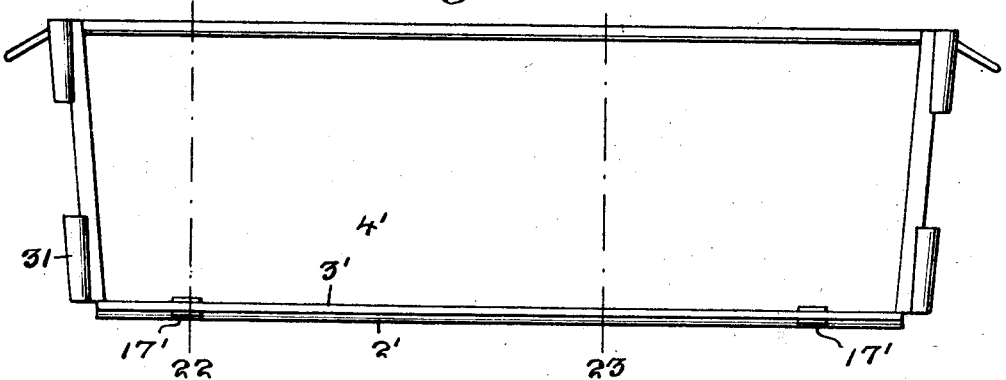
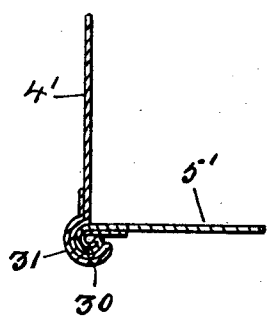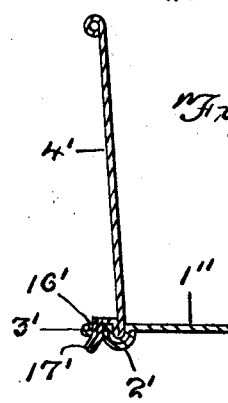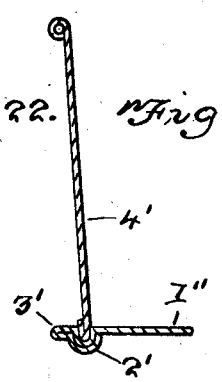

Patented May 21, 1929.

1,714,379

UNITED STATES PATENT OFFICE.

JOHN A. KRATZ, OF BALTIMORE, MARYLAND.

BAKING PAN.

Application filed June 9, 1927. Serial No. 197,676.

This invention relates to improvements in baking pans, the general object of the invention being to provide a pan with removable sides and ends so that a cake or loaf baked in the pan can be easily removed therefrom without danger of breaking the same as there is when a cake or loaf is taken from a pan, the sides of which are immovable.

Another object of the invention is to provide means whereby the sides and ends of the pan can be easily and quickly put in place and removed, with latch means for fastening the sides and ends together in such a manner that there is no danger of the material placed in the pan leaking through the joints of the parts thereof.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 4 is a section on line 4—4 of Figure 1.

Figure 5 is a section on line 5—5 of Figure 1.

Figure 6 is a plan view of one corner of the pan.

Figure 7 is a view of one of the latch members.

Figure 8 is a fragmentary sectional view showing a modification.

Figure 9 is a side view of a corner of a pan showing a modified form of latch means.

Figure 10 is a section on line 10—10 of Figure 9.

Figure 11 is a perspective view of one end of one of the side members showing how the keeper part is arranged thereon.

Figure 12 is a view of a corner of a pan showing another form of latch means.

Figure 13 is a section on line 13—13 of Figure 12.

Figure 14 is a section on line 14—14 of Figure 12.

Figure 15 is a view of a corner of a pan showing still another form of latch means.

Figure 16 is a section on line 16—16 of Figure 15.

Figure 17 is a section on line 17—17 of Figure 15.

Figure 18 is a fragmentary plan view of the pan shown in Figure 8.

Figure 19 is an end view of another modification.

Figure 20 is a side view thereof.

Figure 21 is a section on line 21—21 of Figure 19.

Figure 22 is a section on line 22—22 of Figure 20.

Figure 23 is a section on line 23—23 of Figure 20.

Figure 24 is a view of another modification.

Figure 1:
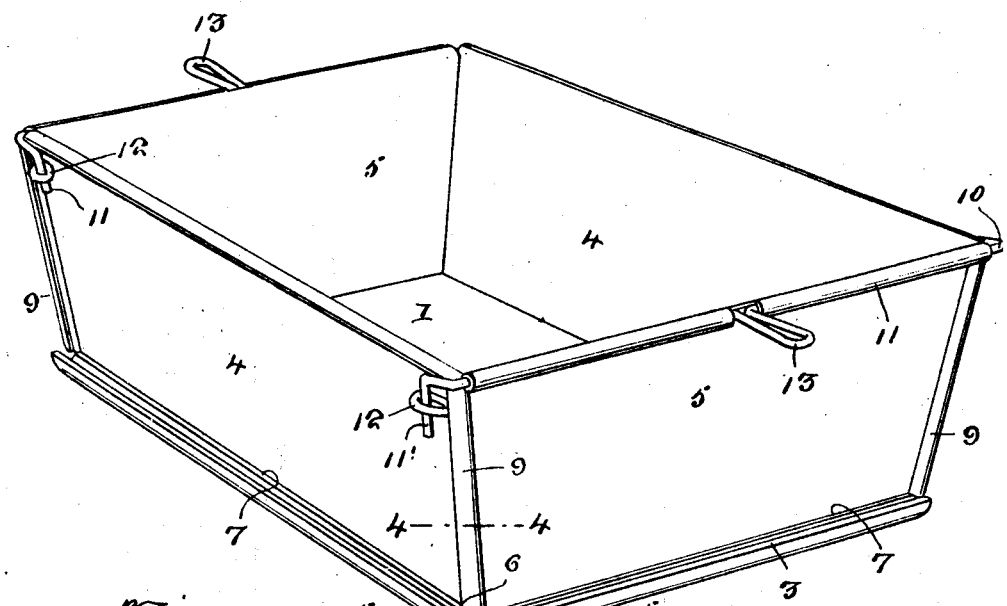
Figure 1 is a perspective view of the improved pan.

In these drawings, 1 indicates the bottom of the pan, each edge of which is provided with a semi-circular or trough extension 2, the outer edge of which is provided with an inwardly extending flange 3. The sides of the pan are shown at 4 and the ends at 5. The lower end of each side and each end is formed with a U-shaped extension 6 which is of such a size as to fit within a member 2, with its outer edge abutting the under face of the flange 3 of said member 2 so that each of the members 4 and 5 of the pan is hingedly connected with the bottom by its member 6 fitting in the member 2, thus permitting either side or end member to be swung outwardly and downwardly away from the loaf or cake baked in the pan. After the side or end member has been moved downwardly to a certain position, its part 6 can be removed from the part 2 so that said side or end member can be entirely separated from the bottom. The member 6 is connected with its side or end member by a short horizontal flange 7 so that said part 6 is spaced outwardly a short distance from the side or end of the pan to which it is connected, as clearly shown in Figure 3. This arrangement forms a joint between the bottom and side or end member, which prevents the material placed in the pan from leaking out between the parts.

The ends of the side pieces 4 are rolled about a reinforcing wire 8 and the ends of the members 5 are shaped to provide semicircular extensions 9 which receive the rolled ends of the side pieces 4 and a latch bar 10 is mounted for rocking movement in the rolled upper edge 11 of each end piece 5, the ends of the latch bar being bent twice at rightangles to provide the latch parts 11 for engaging the eyes 12 formed by looping portions of the wires 8 in the ends of the side pieces 4, these eyes extending through openings formed in the rolled parts of the side pieces. The latch part 11 at one end of the bar 10 is of greater length than that at the other end so that an end piece may be fastened to one of the side pieces 4 by a certain movement of the latch bar and then the other side piece can be fastened to the end piece by a further movement of the latch bar. The latch bar is provided with a handle forming central loop 13 which extends through an opening formed in the rolled part 11 of each end piece so that the bar can be rocked.

From the foregoing it will be seen that the sides and ends are firmly attached together by the latch members and they will be connected to the bottom by the members 6 engaging the members 2 and the parts are so arranged that they will produce a leakproof pan and when a cake or loaf baked in the pan is to be removed therefrom, it is simply necessary to depress the handles 13 of the latch bar so as to lift the latch parts 11 out of the eyes 12 and then the sides and ends can be moved outwardly and downwardly so that the cake or loaf can be lifted off the bottom of the pan. If desired, the sides and ends can be entirely removed from the bottom and the cake or loaf can be allowed to remain on the bottom or this bottom can be used for transporting the cake or loaf from one point to another. It may be necessary to run a knife between the sides and ends and the loaf or cake before moving said sides and ends.

Instead of forming the hinge parts as above described, I may bend the edges of the bottom 1', as shown in Figure 8, to provide the depending flanges 14 which act to space the pan from the surface on which it is placed and the horizontal extensions 15 which are slotted at intervals, as shown at 16. I also form angle shaped tongues 17 on the sides and ends of the pan, each tongue being connected with the side or end by a horizontal flange 18. These tongues are adapted to pass through the slots 16, as shown in Figures 8 and 18, so as to hingedly connect the sides and ends of the pan with the bottom. These parts are so formed that the side or end must be moved outwardly and downwardly to free the tongue from the slot so that the sides and ends of this form of the invention have the same movement as the first form of the invention.

Figures 9, 10 and 11 show a slightly different form of latching means for connecting the ends and sides of the pan together. In this form, each end of each side member is formed with an extension 19 which is bent against the outer face of the side and it is formed with an eye 20 by making two slots in the upper end of the extension and looping the metal between the slots, as clearly shown in Figure 11. The keeper parts of the latch bars engage these eyes 20.

Figures 12, 13 and 14 show another manner of connecting the sides and ends of the pan together. These figures show a latch member 21 arranged at each end of each side member and vertically movable in the loops 22 formed in the turned over extension 19' at each end of each side member. Each latch member is designed to engage a keeper loop 23 formed in a hook-shaped part 24 formed at each end of each side piece, said hook part engaging an end of a side piece, as clearly shown in Figures 13 and 14.

The modification shown in Figures 15, 16 and 17 is somewhat similar to that shown in Figures 12, 13 and 14, except that the hook part 24' is of slightly different form and the latch part 21' is a simple L-shaped rod slidably arranged in a pair of loops 22' carried by a side or end piece and engaging an eye 25 formed on the hook-shaped part 24', the eye part fitting between the loops 22', as shown in Figure 15. As will be seen, in all the forms of the invention, the joints between the ends and the sides of the pan are such as to prevent leakage and the latch parts, with these joints, firmly hold the side and end pieces together.

The flanges 7 and 18 form bearing parts on the sides which rest on the bottom.

In the modification shown in Figures 19 to 23, the bottom 1'' is provided with the trough-shaped extension 2' and the outwardly extending flange 3' at its edges, these parts being reinforced as shown. The sides 4' are each provided with the tongues 17' which are similar to the tongues 17 shown in Figure 8, and these tongues are adapted to pass through the slots 16' formed in the extensions 3' so that the sides are hingedly and removably connected with the bottom. The ends 5' have their reinforced lower edges seated in the trough-shaped parts 2' of the bottom and their reinforced ends are each formed with a pair of rounded enlargements 30, shown in dotted lines in Figure 19. The enlargements are spaced apart and are formed by rolling the reinforced end. Each side at each end is also reinforced by bending the metal upon itself and each end is formed with a pair of spaced hooks 31 for receiving the enlargements 30 of the ends so that the ends of the side and end pieces are connected together by these hooks engaging the enlargements when the pan is in assembled position. When the pan is to be taken apart, the ends are lifted slightly so that the enlargement will pass from the hooks and then the end pieces can be moved outwardly, after which the side pieces can be swung outwardly to leave the cake exposed on the bottom. By having the spaced enlargements and spaced hooks for connecting the ends to the sides, it will be seen that it is simply necessary to lift the ends a slight distance to free them from the sides so that there is no danger of damaging the cake or loaf in the pan by sliding the ends of the pan a great distance over the ends of the loaf or cake.

In the modification shown in Figure 24, the ends and sides are connected together by hinge pins 32, one at each corner of the pan, these pins passing through the barrel parts 33, a pair of which is formed on one side and one of which is formed on the other side or end and fits between the pair, as clearly shown in Figure 24. The lower edges of the bottom of the sides and ends are hingedly connected with the bottom, as described in the first form of the invention.

Figure 2:
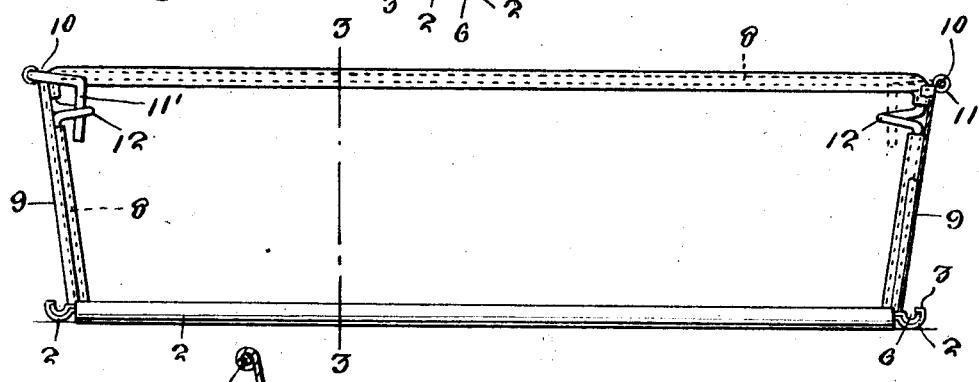
Figure 2 is a side view thereof with parts broken away.
Figure 3:
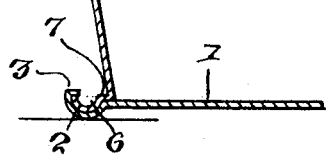
Figure 3 is a section on line 3—3 of Figure 2.
Figure 25:
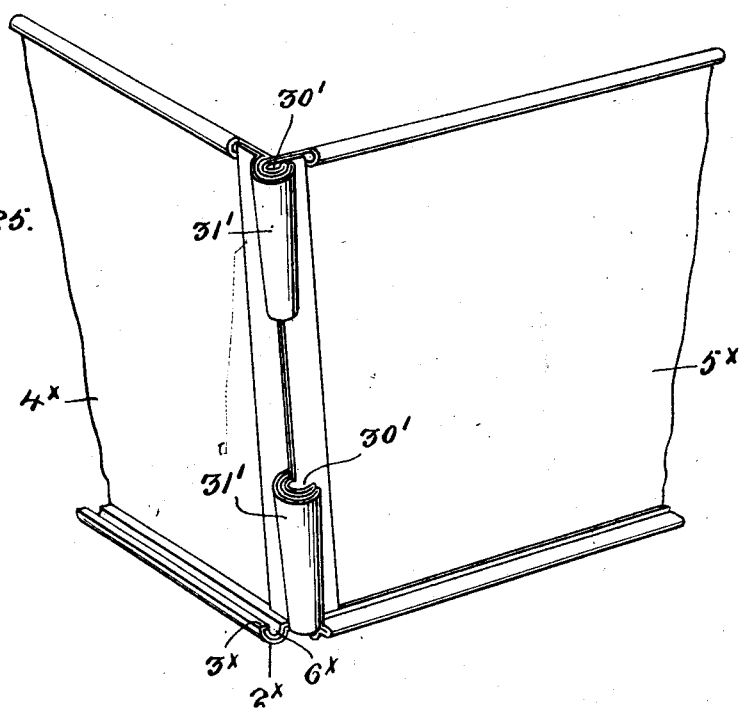
Figures 25 and 26 are fragmentary perspective views showing a modification which embodies the specific means for connecting the ends with the sides, as shown in Figure 19, and the specific means for connecting the sides with the bottom, as shown in Figures 1, 2 and 3.
Figure 26:
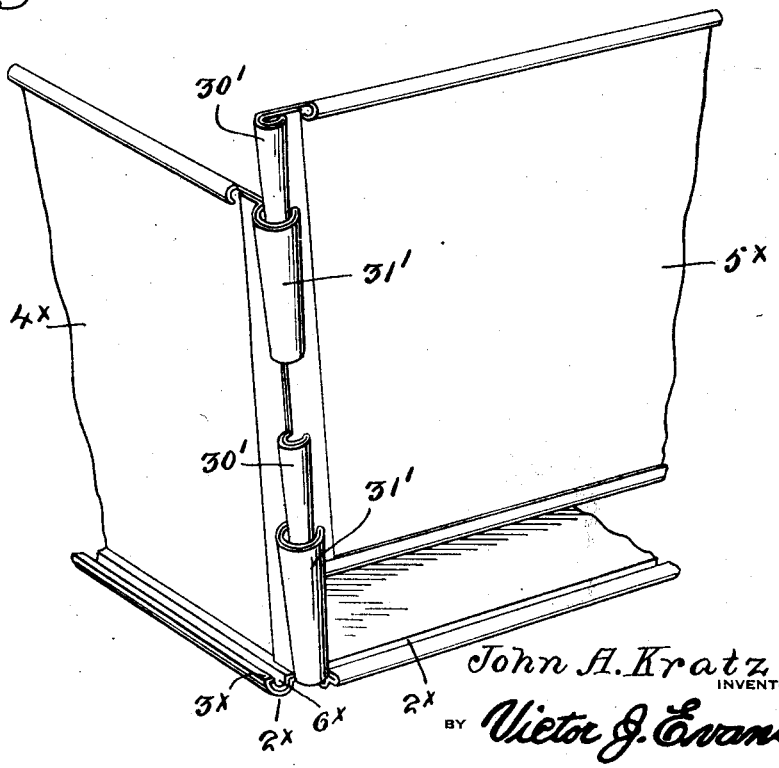

In the modification shown in Figures 25 and 26, the sides and ends of the pan are connected together by forming enlargements 30' on the reinforced ends of the ends of the pan which fit in the hooks 31' formed on the reinforced ends of the sides of the pan. These enlargements and hooks are spaced apart and the ends of the pan are separated from the sides by an upward movement of the ends, as shown in Figure 26. The reinforced lower edge of each end of the pan fits in a plain groove 2ˣ in each end of the bottom of the pan. This arrangement of connecting the ends 5ˣ of the pan with the sides 4ˣ is the same as that disclosed in Figures 19, 20 and 21. The lower edges of the sides of the pan shown in Figures 25 and 26 are connected with the side edges of the bottom by the extensions 6ˣ on the lower edges of the sides fitting in the trough-shaped extensions 2ª at the side edges of the bottom, each trough-shaped extension having an inwardly extending flange 3ˣ on its outer edge against which the outer edge of the extension 6ˣ rests. Thus after the end pieces are raised so that they are disengaged from the side pieces, the side pieces can be freed from the bottom by an outward and downward movement. This arrangement of connecting the sides of the pan, shown in Figures 25 and 26, is similar to that shown in Figures 1, 2 and 3. Thus the form of the pan, shown in Figures 25 and 26 combine the means of connecting the sides of the pan with the bottom, as shown in Figures 1, 2 and 3, with the means of connecting the ends of the pan with the sides, as shown in Figures 19, 20 and 21.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A pan of the class described comprising a bottom, separate sides and ends, said bottom having grooves adjacent its edges for receiving the lower edges of the sides and ends, spaced hooks at each end of each side, spaced enlargements at each end of each end for engaging the hooks of the sides for connecting the sides and ends together and permitting them to be separated by an upward movement of the ends and means for detachably connecting the lower edges of the sides with the bottom.

2. A pan of the class described comprising a bottom, separate sides, the bottom having grooves therein adjacent its edges for receiving the lower edges of the sides, means for detachably connecting each end of each side with the adjacent side and means for connecting some of the sides with the bottom so that said sides can be detached from the bottom by an outward and downward movement of the sides.

3. A pan of the class described comprising a bottom, separate sides, the bottom having grooves therein adjacent its edges for receiving the lower edges of the sides, means for detachably connecting each end of each side with the adjacent side, means for connecting some of the sides with the bottom so that said sides can be detached from the bottom by an outward and downward movement of the sides, such means comprising inwardly extending flanges on the grooved parts of the bottom engaging the groove engaging parts of the sides for holding the lower edges of said sides in said grooves.

4. A pan of the class described comprising a bottom, separate sides and ends, said bottom having grooves therein adjacent its edges for receiving the lower edges of the sides and ends, inwardly extending flanges on the outer walls of the grooves in the side edges of the bottom, the lower edges of the sides being rounded to fit in the grooves in the bottom, with the edges of the rounded parts fitting under the flanges to hold the sides to the bottom, spaced hooks at each end of each side and the ends having spaced enlargements at their ends for engaging said spaced hooks for connecting the sides and ends together and permitting separation of the ends and sides by an upward movement of the ends.

In testimony whereof I affix my signature.

JOHN A. KRATZ.